United States Patent [19]

Laycraft

[11] 4,097,055
[45] Jun. 27, 1978

[54] SKI-SUPPORTED VEHICLES

[76] Inventor: Kevin Wendell Laycraft, 1423 Carlyle Rd. SW., Calgary, Alberta, Canada, T2V 2V2

[21] Appl. No.: 769,930

[22] Filed: Feb. 18, 1977

[30] Foreign Application Priority Data

Jan. 5, 1977 Canada ............... 26919301

[51] Int. Cl. ............................ B62b 13/04
[52] U.S. Cl. ................................... 280/16
[58] Field of Search ........... 280/16, 12 K, 25, 281 R

[56] References Cited

U.S. PATENT DOCUMENTS

| | | | |
|---|---|---|---|
| 484,632 | 10/1892 | Gammeter | 280/16 |
| 2,479,674 | 8/1949 | Elliott | 280/16 |
| 3,533,643 | 10/1970 | Yamada | 280/281 R |
| 3,635,497 | 1/1972 | Porsche | 280/16 |
| 3,717,359 | 2/1973 | Peronnon | 280/16 |

FOREIGN PATENT DOCUMENTS 34,192  12/1905  Switzerland ............ 280/16

*Primary Examiner*—Robert R. Song
*Attorney, Agent, or Firm*—Larson, Taylor and Hinds

[57] ABSTRACT

The invention relates to a single track vehicle, comprising a rearwardly inclined closed loop rigid frame having a built-in strengthening segment towards the rear portion thereof; a steering mechanism; a front ski pivotally articulated to the steering mechanism and; a rear supporting ski fixedly attached to rigid frame. A shock absorber is preferably associated with the front ski to dampen the pivoted action and assist in maintaining good contact between the ski and the ground.

13 Claims, 4 Drawing Figures

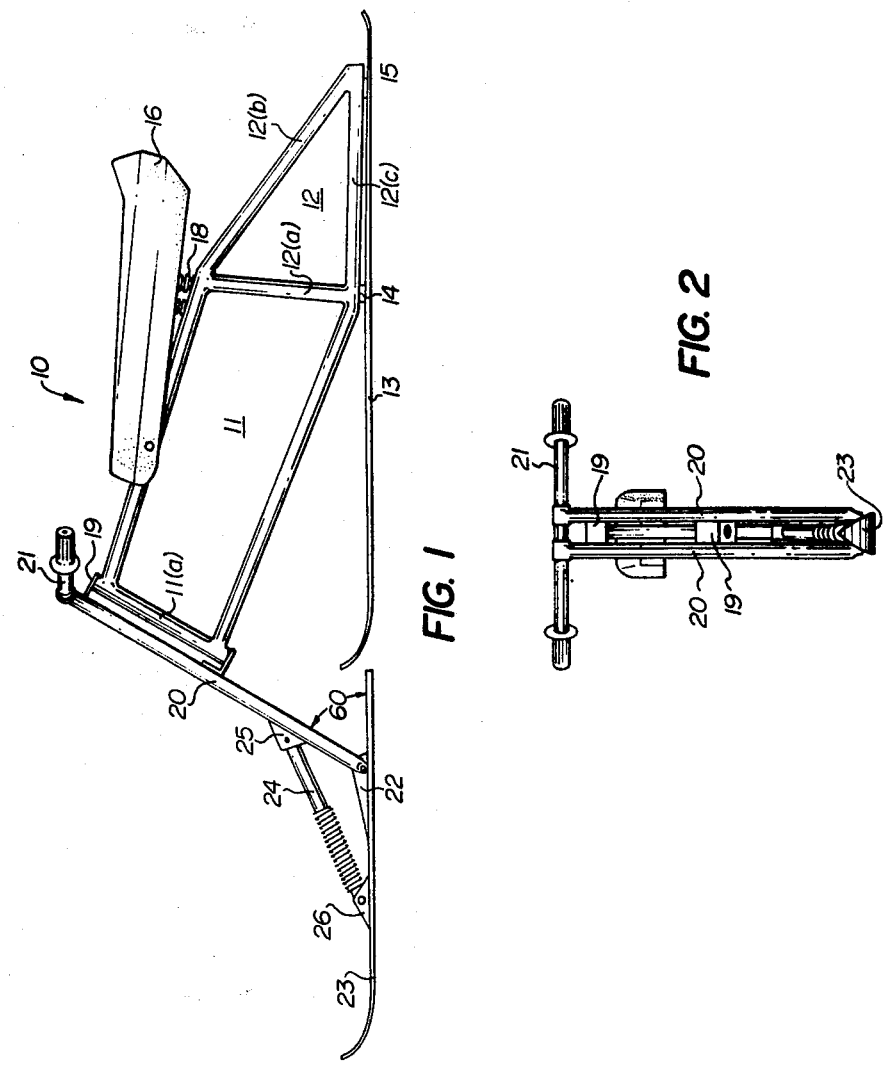

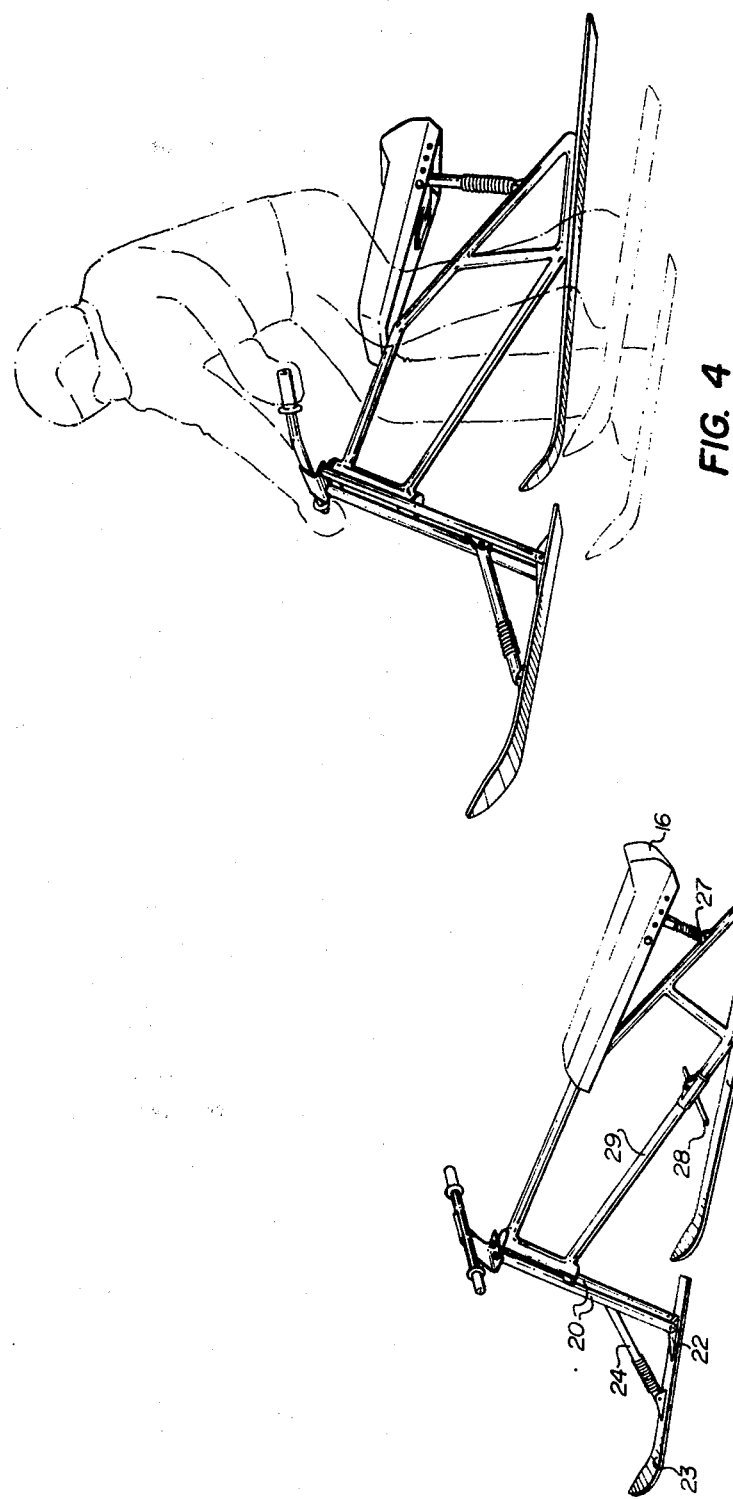

SKI-SUPPORTED VEHICLES

BACKGROUND OF THE INVENTION

The invention relates to improvements in ski-supported vehicles of the type particularly, but not exclusively, adapted for use on snow. More specifically, the invention is concerned with a winter sports vehicle having similar characteristics to that of a conventional bicycle, a seated rider being able to directionally control the vehicle and execute similar maneouvers to that of a skier, at the same, or in fact higher speeds.

Essentially, the "Ski-Bob", which is the name given this particular form of transport, evolved from the snowsled or snow coaster, one early example of which is the subject of U.S. Patent Ser. No. 1,672,782, issued June 5, 1928 to C. R. Ring. At that time, the device was classified as a childs toy, and was an improvement over a conventional sled in that the rider had to maintain balance over a relatively thin and laterally narrow slider. In this device, some degree of steerability was provided by lateral flexing of the runner in response to movement of the handlebars, however this did not provide the degree of movement necessary to execute, for example high speed, tight angle turns.

In order to improve maneouverability, the design of the "Ski-Bob" underwent numerous changes, two examples of which were the subject of U.S. Pat. No. 3,658,357, issued to Porsche KG in 1972, and U.S. Pat. No. 3,682,495, issued to K. Zaimi in 1972. In the former design a pair of supporting runners were utilized positioned in line, that is one behind the other in the direction of travel, the foremost runner being associated with the steering mechanism, and the rearmost runner being connected to the substantially horizontal vehicle frame by a pair of guides taking the form of an articulated parallelogram. This relatively complex linkage arrangement was intended to permit the rear runner to assume an angular relationship with the slope on which the vehicle is travelling in order to maintain constant contact.

The second of the two patents mentioned above considers the steerable aspect of importance and requires a pair of steerable slides mounted in tandem to the steering mechanism, and a short rear supporting slider attached by means of a simple spring-like member to the rear of the vehicle frame.

It is accepted that both of these designs provide for increased moveability over the prior, single slider vehicle of Ring. However in order to achieve this feature very little thought was given to the physical construction of either vehicle in relation to the severe stresses encountered by the vehicle when in use. For example, parallelogram linkages such as proposed by Porsche are inherently weak under impact loading, and the simple locking arrangement disclosed in U.S. Pat. No. 3,658,357 to facilitate attachment of the rear slider to the frame would be unlikely to accommodate high shock conditions. As speeds in excess of 96 km/hr are feasable with vehicles of this nature, failure of the locking mechanism and the subsequent collapse of the linkage could have serious consequences.

The vehicle according to Zaimi, by utilizing a pair of separately manipulatable front steerable sliders is considered even more susceptible to component failure, and for this reason it would seem that use of this particular vehicle at least in its gravity operated mode must be restricted to prepared surfaces devoid of any major irregulations.

SUMMARY OF THE INVENTION

The present invention therefore seeks to improve over the prior art in terms of structural strength, maneouverability and control, by providing a vehicle which comprises essentially in a rearwardly inclined supporting frame of closed-loop configuration which incorporates a triangulated strengthening segment at the rear end thereof. A steering mechanism is included which comprises at least one steering column pivotally attached to an upper front portion of the frame with a handlebar attached to the upper end of the steering column. A front ski is pivotally attached to the lower end of the steering mechanism, pivotal movement being constrained by a shock absorber mounted between the ski and the steering mechanism.

A rear supporting ski is rigidly attached to a lower horizontal portion of the frame, which portion forms part of the heretoforementioned triangulated segment, the ski extending longitudinally of the frame and in alignment with the front ski. A seat is provided resiliently mounted on top of the frame and the seat can be provided with a shock absorber to increase the overall cushioning effect.

In a preferred construction of the invention, the steering mechanism comprises two steering columns arranged in spaced parallel relation and fixedly attached one to the other by brackets. Additionally, the steering mechanism is rearwardly inclined with respect to the frame, forming an acute angle of between 50° - 65° with the front ski when in its horizontal position.

Finally, it is also preferable that the steering mechanism be attached to the front ski a distance at least equal to a third of the length of the ski from the rear end thereof and that the longitudinal extension of the rear supporting ski be such that the curved portion of the rear ski overlaps the rear end of the front ski.

DESCRIPTION OF THE DRAWINGS

The invention will now be described by way of example only, reference being had to the accompanying drawings in which:

FIG. 1 is a side elevation of a snow-vehicle according to the invention;

FIG. 2 is a front elevational view of the vehicle according to FIG. 1;

FIG. 3 shows a modified version of the vehicle shown in FIGS. 1 and 2, and;

FIG. 4 shows the vehicle of FIG. 3 in operation.

DESCRIPTION OF THE PREFERRED EMBODIMENT(S)

Referring now to the drawings, in which for clarity, like numerals are utilized to indicate like component parts, FIGS. 1 and 2 show a basic form of the vehicle 10 constructed in accordance with the invention. The main component of the vehicle 10 comprises what will be referred to hereafter as a closed-loop rigid tubular metal frame 11 which incorporates, as a strengthening feature at the rear of the frame, a segment 12 of triangular configuration formed by frame members 12(*a*), 12(*b*) and 12(*c*). Rigidly attached to the lowermost frame member 12(*c*) is a supporting ski or slider 13. The attachment may be as shown in FIG. 1, in two locations 14 and 15, and preferably, means, not shown, should be provided to permit replacement of the ski if required.

Mounted on the upper rearward portion of frame 11 is seat 16 pivotally attached at its front section to the frame by means of pin 17, and resiliently supported intermediate its length by springs 18.

The foremost portion of frame 11, indicated as 11(a) is pivotally attached by bracket means 19, to the steering mechanism of the vehicle, which, as can be seen from FIG. 2 consists essentially in a pair of steering columns 20 held fixedly in spaced parallel relation by brackets 19. To the upper ends of column 20 is affixed a conventional type handlebar 21, and the lower ends of column 20 are pivotally attached by a suitable bracket 22, to a front steering ski or slider 23. Pivotal movement is however restricted by use of a forwardly mounted shock absorber unit 24 extending from a bracket 25 on columns 20 to a bracket 26 attached to front ski 23. The shock absorber additionally, and importantly serves to cushion the effect of any high impact loading which would be applied directly at bracket 22 and the pivotal connection between the ski 23 and steering column 20, and also serves to ensure that a sufficient area of the undersurface of ski 23 be maintained in contact with the ground, thus providing positive directional control of the vehicle irrespective of the effect of ground irregulations.

There are a number of additional features that contribute to the structural superiority of the present invention.

Firstly, the rear supporting ski 13 is positioned in the assemblage so that its curved forward end somewhat overlaps the rear end of steering ski 23, so as not to be unduly affected by the wake of ski 23 when the vehicle is being used in deep powder snow.

Secondly, the angular relationsip between the steering column 20 and the frame 11 has been found to be of importance with regard to the overall steering and stability of the vehicle. Tests have proved that to achieve maximum directional control of the steering ski, steering columns 20 should have a rearward angular inclination of between 50° - 65° from the horizontal, and that the pivotal connection between the steering column 20 and front ski 23 should preferably be located substantially one third of the length of the ski, from the rear end thereof. Additionally the positioning of bracket 26 forwardly of bracket 22 should be such as to permit some degree of natural flexing of the first section of ski 23, as would be experienced when traversing insignificant ground irregularities, and further allows the cusioning effect of shock absorber unit 24 to be utilized to dampen excess pivoting of the front ski when the vehicle traverses rougher surfaces.

Finally, it is also of importance that the frame 11 be angularly inclined in a rearward direction such that substantially all the load applied to the frame is directed through the rear supporting ski. This provides for more positive control at high speeds and further permits the seat arrangement to be lowered thus reducing wind resistance.

FIGS. 3 and 4 show a variation of the vehicle according to the invention which incorporates certain additional modifications intended to further improve the handling characteristics of the basic vehicle.

As can be seen, the configuration of the closed loop frame 11 has been altered such that the rearward slope is more pronounced. This achieves a two-fold purpose, firstly it allows the seat 16 to be lowered, and secondly it permits the inclusion of a shock-absorber unit 27 between the seat and member 12(b). As depicted, means are provided to enable the position of the seat to be adjusted to increase the angular inclination of the seat with respect to the forward end of the vehicle. This comination of features provides for a much smoother ride while effectively increasing the speed capability of the vehicle.

A further variation, shown in FIG. 3 is a foot rest 28 which may be adjustably located on member 29 of frame 11. The invention as shown in FIG. 4 however does not require the footrest since in this mode of operation, the vehicle operator (shown in phantom) has short ski's 30 which are utilized as an additional means for stabilization.

Finally, the handlebar arrangement of FIGS. 1 and 2 has been modified such that handlebar 21 is resiliently attached to steering column 20 by means of a spring-like member 31 preferably formed from spring steel. This modification serves to further absorb shock loads transmitted through the steering mechanism by impact of the front ski with the ground. This improves the handling characteristics since it lessens the possibility of control being lost by sudden shock loading through the system.

Further modifications and alternative emdobiments of the invention will be apparent to those skilled in the art in view of the description. Accordingly, the description is to be construed as illustrative only and is for the purpose of leading those skilled in the art, the manner of carrying out the invention. It is understood that the form of the invention herewith shown and described is to be taken as the presently preferred embodiment. Various changes may be made in the shape, size and general arrangement of components. For example, equivalent elements may be substituted for those illustrated and described herein, parts may be reversed and certain features of the invention may be utilized independently of the use of other features, all as will be apparent to one skilled in the art after having the benefit of this description of the invention.

What I claim is:

1. A vehicle comprising: a rearwardly inclined supporting frame of closed-loop configuration incorporating a triangulated strengthening segment at the rear end thereof, said triangulated segment including a generally horizontal lower member; a steering mechanism comprising at least one steering column pivotally attached to an upper front portion of said frame, and handle means attached to such steering mechanism; a front ski, pivotally attached to the lower end of said steering mechanism, pivotal movement being constrained by shock absorber means mounted between said ski and said at least one steering column; a rear supporting ski, rigidly attached to said generally horizontal lower member to extend longitudinally thereof such that the front portion of said rear ski extends substantially unsupportedly and forwardly from said lower member and is permitted to flex in response to contact with a snow surface and; seat means resiliently mounted on a upper, rear portion of said frame.

2. The vehicle according to claim 1 wherein said steering mechanism is rearwardly inclined with respect to said frame forming an acute angle of between 50° - 65° with the front ski when in its horizontal position.

3. The vehicle according to claim 2 wherein said steering mechanism comprises two steering columns arranged in spaced parallel relation and fixedly attached one to the other by bracket means.

4. The vehicle according to claim 1 wherein said steering mechanism is attached to said front ski a distance approximately equal to a third of the length of said ski from the rear end thereof.

5. The vehicle according to claim 1 including footrest means, adjustably positioned on said frame.

6. The vehicle according to claim 1 including a shock absorber operably connected between said frame and said seat means.

7. The vehicle according to claim 6 wherein said shock absorber is releasably attached to said seat means in such a manner as to permit said seat means to be adjustable in height relative to said frame.

8. The vehicle according to claim 1 wherein said front ski is substantially shorter than said rear supporting ski.

9. The vehicle according to claim 1 wherein said handle means is resiliently attached to said steering mechanism.

10. The vehicle according to claim 1 wherein the resilient mounting of said seat is affected by a shock absorber adjustably mounted between said seat and a lower rear portion of said frame.

11. The vehicle according to claim 1 wherein the unsupported forward end of said rear ski substantially overlaps and lies above the rear end of said front ski when in the straight-ahead steering position.

12. The vehicle according to claim 1 wherein said triangulated segment includes a forward generally upright member and a rear inclined member connected at their lower ends with the ends of said generally horizontal lower member and connected together at their upper ends, said seat member being located above said generally upright member.

13. The vehicle according to claim 12 wherein said seat member extends rearwardly beyond said generally upright member, and is connected to and partially supported by said rear inclined member.

* * * * *